(12) United States Patent
Bosenko

(10) Patent No.: US 9,515,706 B2
(45) Date of Patent: Dec. 6, 2016

(54) SYSTEMS, METHODS AND APPARATUSES FOR WIRELESS CAPACITIVE RECEPTION AND TRANSMISSION OF SIGNALS WITH DISTORTION COMPENSATION IN A CHANNEL (VARIANTS)

(71) Applicant: Rostyslav Volodymyrovych Bosenko, Kiev (UA)

(72) Inventor: Rostyslav Volodymyrovych Bosenko, Kiev (UA)

( * ) Notice: Subject to any disclaimer, the term of this patent is extended or adjusted under 35 U.S.C. 154(b) by 133 days.

(21) Appl. No.: 14/390,773

(22) PCT Filed: Mar. 26, 2013

(86) PCT No.: PCT/UA2013/000029
§ 371 (c)(1),
(2) Date: Jun. 11, 2015

(87) PCT Pub. No.: WO2013/151521
PCT Pub. Date: Oct. 10, 2013

(65) Prior Publication Data
US 2015/0349853 A1    Dec. 3, 2015

(30) Foreign Application Priority Data

Apr. 4, 2012   (UA) .............................. A 2012 04202

(51) Int. Cl.
| | | |
|---|---|---|
| *H04B 5/00* | (2006.01) | |
| *H04B 5/02* | (2006.01) | |
| *H04W 4/00* | (2009.01) | |
| *H04W 88/02* | (2009.01) | |

(52) U.S. Cl.
CPC .............. *H04B 5/02* (2013.01); *H04B 5/0012* (2013.01); *H04W 4/008* (2013.01); *H04W 88/02* (2013.01)

(58) Field of Classification Search
CPC ............................. H04B 5/0012; H04W 4/008
See application file for complete search history.

(56) References Cited

U.S. PATENT DOCUMENTS

| | | | | |
|---|---|---|---|---|
| 7,889,804 B2* | 2/2011 | Borran | ................... | H04L 1/0612 375/267 |
| 2009/0091403 A1* | 4/2009 | Hemmerlein | .......... | G08C 15/08 333/172 |

* cited by examiner

*Primary Examiner* — David Bilodeau

(57) ABSTRACT

Disclosed is a system for wireless capacitive reception and transmission of signals with distortion compensation in a channel, including a transmitting and a receiving apparatuses, which are configured, respectively, of wirelessly transmitting and receiving signals, wherein the transmitting apparatus comprises a signal precompensator with an input for data signals which are transmitted, a signal driver with an input for prepared signals and precompensation signals, and transmitting terminals which are spaced apart and are connected to the outputs of the signal driver in such a way that corresponding electrical fields are produced. The receiving apparatus includes spaced-apart receiving terminals, which are capable of detecting the electrical fields produced by the transmitting terminals and received signals which are reproduced on the receiving terminals, and an adaptive signal corrector, the inputs of said adaptive signal correcter being connected to the receiving terminals, and which adaptive signal corrector has outputs for received data signals.

21 Claims, 12 Drawing Sheets a)                  б)

SYSTEMS, METHODS AND APPARATUSES FOR WIRELESS CAPACITIVE RECEPTION AND TRANSMISSION OF SIGNALS WITH DISTORTION COMPENSATION IN A CHANNEL (VARIANTS)

This application is a national stage application under 35U.S.C. §371 of International Application No. PCT/UA2013/00029 filed on Mar. 26, 2013, which claims priority to Ukrainain Application No. 2012-04202, filed on Apr. 4, 2012, incorporated herein by reference.

FIELD OF THE INVENTION

The invention relates to the field of electronic communication systems. More specifically, the invention relates to high-speed, short-range, capacitive wireless systems, methods, and apparatuses that can be used for streaming data between two adjacent electronic devices, modules or semiconductor chips, etc.

BACKGROUND OF THE INVENTION

Unlike the traditional radio systems, wireless communication between the various electronic devices or blocks of one electronic system, i.e. the transmission of analog and digital signals at close—millimeter or centimeter—distances, can be implemented effectively by means of the capacitive coupling. Recently, the capacitive coupling devices have become more widespread due to the appearance of new element base of electronic components, which become more high-speed and are more suitable for making electrical circuits for wireless capacitive coupling devices on practice.

Capacitive coupling systems are known as such systems in which the signals are transmitted from one conductive element to another conductive element, provided that two conductors are separated by a nonconductor. An electric field is created between two conductors, and as a result, an electrical potential applied to the first conductor can be detected on the second conductor through the electric field.

Capacitive communication systems exist as a whole, including the ones where data is transmitted between integral circuits. For example, the U.S. Pat. No. 6,916,719 (published on Jul. 12, 2005) describes apparatuses and methods, which comprise "pairs of half-capacitor plates", with one half located on each chip, and a module or a substrate are used to couple signals capacitively from one chip, module or substrate to another. A disadvantage of these systems is that they usually require a common source of power supply and grounding and also the lack of compensation of distortion that may result, in certain cases, to narrowing of operating frequency range and to errors in the data.

The U.S. Pat. No. 6,336,031 (published on Jan. 1, 2002) describes (I) a transmitter that comprises a pair of electrodes separated in space, and a transmit circuitry for varying the voltage difference applied across the transmitter's electrodes in order to vary the spatial gradient of the electric potential field generated by the transmitter in accordance with the data to be transmitted and (II) which comprises a pair of electrodes separated in space and a receive circuitry which detects these variations in the quasi-electrostatic potential field in order to receive the transmitted data.

Another capacitive communication system, described in claim for an invention US 2009/0143009A1 (published on Jan. 4, 2009), describes a signal transmitting apparatus having a signal transmitting electrode, which receives transmitted signal, and a signal receiving apparatus having a signal receiving electrode, from which the signal is carried out and converted, including a comparator with a hysteresis characteristic, with the aim to receive the transmitted data. The drawback of the above inventions is the absence of compensation of distortion in capacitive communication channel which may result in errors in the data when transmitting two or several rows of ones and zeros in a dataflow.

A significant drawback of systems, methods and devices described in these patents is that they do not solve the task of minimizing the impact of external factors (such as electromagnetic interference, resulting in the higher number of errors in a channel and/or the actual loss of connection) on the capacitive connector and thus on the system operation.

The methods of signal compensation for the implementation of a wireless transmission and receiving of signals, which may include signal filtering, where the correction occurs on both sides of the capacitive transmission system, are also known. But the use of filtering in a filtering transmitting apparatus results not only in the partial signal precompensation but, simultaneously, in the partial signal distortion, which in case of unstable capacitive connection parameters (for example, between devices) also can lead to the changes in transmission efficiency depending on the data signals being transmitted.

Given the existence of these technologies, there is still a need for improved systems, methods and apparatuses of wireless communication that can ensure high speed data transmission, with the lower level of errors during transmission, in the presence of electromagnetic interference, and which do not require common wires or grounding, do not need much power, including operation in case of wireless power supply.

SUMMARY OF THE INVENTION

The aim of the claimed invention is to compensate the distortions in the capacitive receiving and transmission channel and to reduce the impact of external factors, such as electromagnetic interference, on the capacitive channel during data receiving and transmission, and thus to increase the efficiency of the capacitive wireless signal receiving and transmission.

The technical result is achieved by developing such a system which in one embodiment (hereafter referred as the capacitive signal receiving and transmission system embodiment 1) comprises transmitting and receiving apparatuses configured with the ability to transmit and receive the signals wirelessly. Wherein the transmitting apparatus comprises a single-channel differential signal precompensator, a single-channel differential signal driver and at least one pair of spaced apart transmitting terminals. A single-channel differential signal precompensator which has an input for data signals being transmitted is configured with the ability to generate one pair of prepared signals and one pair of direct and inverted precompensation signals on the outputs. A single-channel differential signal driver which has an input for one pair of prepared signals and an input for direct and inverted precompensation signals is configured with the ability to generate one pair of pre-compensated direct and inverted signals on the outputs. At least one pair of spaced apart transmitting terminals is coupled to the signal driver's outputs so as to produce respective electric fields which constitute one pair of signals—the pre-compensated direct and inverted signal. The receiving apparatus comprises at least one pair of spaced apart receiving terminals and a single-channel differential adaptive signal corrector configured with the ability to correct the received signal and recover the data. A pair of receiving terminals has the ability to detect electric fields created by transmitting terminals that reproduce one pair of received signals—direct and inverted signals—on the receiving terminals. The inputs of a single-channel differential adaptive signal corrector, configured with the ability to correct the received signals and to recover the data, are connected to at least one pair of receiving terminals, whereas the corrector has also outputs for received data signals. This should meet the following conditions: the transmitting apparatus is oriented with respect to the receiving apparatus so as to provide at least a partial coverage of terminals' working surfaces of both apparatuses, and terminals' working surfaces of both apparatuses are separated from each other by at least one non-conductive medium.

Another one embodiment which is also the subject of present invention (hereafter referred as the capacitive signal receiving and transmission system embodiment 2) also comprises transmitting and receiving apparatuses configured with the ability to transmit and receive the signals wirelessly. Wherein the transmitting apparatus comprises a multi-channel single-ended signal precompensator, a multi-channel single-ended signal driver and at least two spaced apart transmitting terminals. A multi-channel single-ended signal precompensator has an input for the data signals being transmitted and is configured with the ability to generate one prepared signal and at least one precompensation signal on the outputs. A multi-channel single-ended signal driver which has an input for one prepared signal and an input for at least one precompensation signal is configured with the ability to generate at least one direct signal and one precompensation signal on the outputs. At least two spaced apart transmitting terminals coupled to the signal driver's outputs so as to create electric fields that represent at least one direct signal and one precompensation signal. A receiving apparatus comprises at least two spaced apart receiving terminals and a multi-channel single-ended adaptive signal corrector. Whereas receiving terminals are capable to detect electric fields created by transmitting terminals that reproduce at least two received signals—direct signal and precompensation signal—on the receiving terminals. The inputs of a multi-channel single-ended adaptive signal corrector, configured with the ability to correct the received signals and to recover the data, are connected to at least two receiving terminals, whereas the corrector has also outputs for received data signals. This should meet the following conditions: the transmitting apparatus is oriented with respect to the receiving apparatus so as to provide at least a partial coverage of terminals' working surfaces of both apparatuses, and the terminals' working surfaces of both apparatuses are separated from each other by at least one non-conductive medium.

Another embodiment which is also the subject of present invention (hereafter referred as the capacitive signal receiving and transmission system embodiment 3) comprises respectively transmitting and receiving apparatuses configured with the ability to transmit and receive the signals wirelessly. Wherein the transmitting apparatus comprises a multi-channel differential signal precompensator, a multi-channel differential signal driver and at least one pair of spatially separated transmitting terminals. A multi-channel differential signal precompensator, which has an input for data signals being transmitted, is configured with the ability to generate one pair of prepared signals and at least one pair of direct and inverted precompensation signals on the outputs.

A multi-channel differential signal driver with an input for one pair of prepared signals and with the inputs for at least one pair of precompensation signals—the direct and inverted ones—is configured with the ability to generate at least two pairs of signals on the outputs—direct and inverted signals and direct and inverted precompensation signals. A receiving apparatus comprises at least two pairs of spaced apart receiving terminals and a multi-channel differential adaptive signal corrector. Providing that the receiving terminals are capable to detect electric fields created by transmitting terminals that reproduce at least two pairs of received signals—direct and inverted signals and direct and inverted precompensation signal—on the receiving terminals. The inputs of multi-channel differential adaptive signal corrector, configured with the ability to correct the received signals and to recover the data, are connected to at least two pairs of receiving terminals, whereas the corrector has also outputs for received data signals. This should meet the following conditions: a transmitting apparatus is oriented with respect to the receiving apparatus so as to provide at least a partial coverage of terminals' working surfaces of both apparatuses, and the terminals' working surfaces of both apparatuses are separated from each other by at least one non-conductive medium.

It is expedient to include a retainer in the structure of the aforesaid systems, configured with the ability to fix transmitting and receiving apparatuses of the corresponding sides in the oriented position.

A transmitting apparatus for the wireless capacitive signal transmission with distortion compensation in a channel, which is a part of the capacitive signal receiving and transmission system embodiment 1, and which is also a subject of the present invention (hereinafter referred as the transmitting apparatus embodiment 1) comprises: a single-channel differential signal precompensator with an input for data signals being transmitted configured with the ability to generate one pair of prepared signals and one pair of direct and inverted precompensation signals on the outputs; a single-channel differential signal driver with an input for one pair of prepared signals and with an input for direct and inverted precompensation signals configured with the ability to generate one pair of direct and inverted pre-compensated signals on the outputs; at least one pair of spaced apart transmitting terminals connected to the signal driver outputs so as to create the appropriate electric fields, which represent one pair of signals—the direct and inverted pre-compensated signals.

Another embodiment of a transmitting apparatus for wireless capacitive signal transmission with distortion compensation in a channel, which is a part of the capacitive signal receiving and transmission system embodiment 2, and which is also a subject of the present invention (hereinafter referred as the transmitting apparatus embodiment 2) comprises: a multi-channel single-ended signal precompensator with an input for data signals being transmitted configured with the ability to generate one prepared signal and at least one precompensation signal; a multi-channel single-ended signal driver with an input for one prepared signal and with an input for at least one precompensation signal configured with the ability to generate at least one direct and one precompensation signal on the outputs; at least two spaced apart transmitting terminals connected to the signal driver outputs so as to create the appropriate electric fields, which represent at least one direct signal and one precompensation signal.

Another embodiment of transmitting apparatus for the wireless capacitive signal transmission with distortion compensation in a channel, which is a part of the capacitive signal receiving and transmission system embodiment 3, and which is also a subject of the present invention (hereinafter referred as the transmitting apparatus embodiment 3) comprises: a multi-channel differential signal precompensator with an input for data signals being transmitted configured with the ability to generate one pair of prepared signal and at least one pair of direct and inverted precompensation signal; a multi-channel differential signal driver with an input for one pair of prepared signals and with the inputs for at least one pair of direct and inverted precompensation signals configured with the ability to generate at least two pairs of signals: direct and inverted signals and direct and inverted precompensation signals on the outputs; at least two pairs of spaced apart transmitting terminals connected to the signal driver outputs so as to create the appropriate electric fields, which represent at least two pairs of signals, direct and inverted signals and direct and inverted precompensation signals.

In some embodiments it is expedient to include into aforesaid transmitting terminals the following units: encoding unit for data input signals, and/or delay line, and/or filter, and/or amplifier of at least one of the signals taken from the group consisting of direct signal, inverted signal, direct precompensation signal, inverted precompensation signal before feeding them to at least one of the transmitting terminals.

It is also expedient to provide the aforesaid transmitting apparatus with the function that will ensure generation of a presence identifier signal on its side and determination of a presence identifier signal of the receiving apparatus on the other side.

It is expedient to include the additional elements in aforesaid transmitting apparatuses that are selected from the group comprising: serialization unit, aggregation unit with other transmitting apparatuses, interface and/or coordination unit with external systems, interface and/or coordination unit with the external standard communication interface, retainer configured to fix the transmitting apparatus to the receiving apparatus of the other side in oriented position, or any combination thereof.

It is also expedient to provide aforesaid transmitting apparatuses with at least one rejection groove, which is made of conductive medium and filled with nonconductive material that ensures partial or complete coverage of the working surface of at least one terminal.

A method for the wireless capacitive signals transmission with compensation of distortion in the channel, which is also a subject of the present invention and which uses the transmitting apparatus embodiment 1, consists of the following steps: forming one pair of prepared signals and the direct and inverted precompensation signals on the outputs of a single-channel differential signal precompensator; feeding one pair of prepared signals and the direct and inverted precompensation signals to the inputs of a single-channel differential signal driver; forming direct and inverted precompensated signals on the output of a single-channel differential signal driver; feeding direct and inverted precompensated signals to at least one pair of spaced apart transmitting terminals that create electric fields representing the direct and inverted pre-compensated signals.

Another method for the wireless capacitive signals transmission with compensation of distortion in the channel, which is also a subject of the present invention, uses the transmitting apparatus embodiment 2 and consists of the following steps: forming one prepared signal and one precompensation signal on the outputs of a multi-channel single-ended precompensator of signals; feeding one prepared signal and one precompensation signal to the inputs of a multi-channel single signal driver; forming at least one direct signal and one precompensation signal on the output of a signal driver; feeding at least one direct signal and one precompensation signal to at least two spaced apart transmitting terminals that create electric fields representing a direct signal and a precompensation signal.

Another one method for the wireless capacitive signals transmission with compensation of distortion in the channel, which is also a subject of the present invention, uses a transmitting apparatus embodiment 3 and consists of the following steps: forming one pair of prepared signals and the direct and inverted precompensation signals on the outputs of a multi-channel differential precompensator of signals; feeding one pair of prepared signals and the direct and inverted precompensation signals to the input of a multi-channel differential signal driver; forming at least two pairs of signals—direct and inverted signals and direct and inverted precompensation signals; feeding at least two pairs of signals—direct and inverted signals and direct and inverted precompensation signals—to at least two pairs of spaced apart transmitting terminals that create electric fields representing a direct and inverted signal and a direct and inverted precompensation signal.

It is expedient to provide the aforementioned methods with the fixing the transmitting apparatus and the respective receiving apparatus on the other side of the wireless capacitive signal transmission to each other in oriented position.

It may also be advisable to provide the aforementioned methods with the encoding of data input signals and/or delay and/or filtering and/or amplification of at least one of the signals selected from the group comprising: direct signal, inverted signal, direct precompensation signal, inverted precompensation signal, before feeding them to at least one of the transmitting terminals.

It may also be advisable to provide the aforementioned methods with the production of a presence identifier signal on its side and determination of a presence identifier signal of a receiving apparatus on the other side.

A receiving apparatus for the wireless capacitive signal receiving with distortion compensation in a channel, which is a part of the capacitive signal receiving and transmission system embodiment 1, and which is also a subject of the present invention (hereinafter referred as the receiving apparatus embodiment 1) comprises: at least one pair of spaced apart receiving terminals, capable to detect the electric fields created by transmitting terminals, that reproduce one pair of received signals—direct and inverted signals—on the receiving terminals; a single-channel differential adaptive signal corrector configured with the ability to correct a received signal and to recover data which inputs are connected to at least one pair of receiving terminals and which has outputs of received data signals.

A receiving apparatus for the wireless capacitive signal receiving with distortion compensation in a channel, which is a part of the capacitive signal receiving and transmission system embodiment 2, and which is also a subject of the present invention (hereinafter referred as the receiving apparatus embodiment 2) comprises: at least two spaced apart receiving terminals, capable to detect the electric fields created by transmitting terminals, that reproduce at least two received signals—direct signal and precompensation signal—on the receiving terminals; a multi-channel single-ended adaptive signal corrector configured with the ability to correct received signals and to recover data, which inputs are connected to at least two receiving terminals and which has outputs of received data signals.

A receiving apparatus for the wireless capacitive signal receiving with distortion compensation in a channel, which is a part of the capacitive signal receiving and transmission system embodiment 3, and which is also a subject of the present invention (hereinafter referred as the receiving apparatus embodiment 3) comprises: at least two pairs of spaced apart receiving terminals, capable to detect the electric fields created by transmitting terminals, that reproduce at least two pairs of received signals—direct and inverted signals and direct and inverted precompensation signals—on the receiving terminals; a multi-channel differential adaptive signal corrector configured with the ability to correct received signals and to recover data, which inputs are connected to at least two pairs of receiving terminals and which has outputs of received data signals.

It is expedient to provide the aforesaid receiving apparatuses with the function that will ensure generation of the presence identifier signal on its side and determination of the presence identifier signal of the transmitting apparatus on the other side.

It is also expedient to provide the above mentioned receiving apparatuses with a decoding unit for recovered data signals and/or interface and/or coordination unit with external systems.

It is expedient to include the additional elements in the aforesaid receiving apparatuses that are selected from the group comprising: interface and/or coordination unit with external standard data exchange interface, delay line, filter, amplifier of at least one of the signals—direct and inverted received signal, a clock signal recovered from the received data signal, deserializer unit, aggregation unit with other receiving apparatuses, retainer configured with the ability to fix the receiving apparatus to the transmitting apparatus of the other side in oriented position, or any combination of them.

It is also expedient to provide the receiving apparatuses with at least one rejection groove, which is made in conductive medium and filled with nonconductive material that ensures partial or complete surrounding of the working surface of at least one terminal.

A method for the wireless capacitive signals receiving with compensation of distortion in the channel, which is also a subject of the present invention, uses the receiving apparatus embodiment 1 and consists of the following steps: positioning of the receiving apparatus against the transmitting apparatus so as to provide at least partial coverage of the working surfaces of both apparatuses' terminals, and that the working surface of the terminals of both apparatuses are separated from each other by at least one non-conductive medium; detection of the electric field reproducing a direct and inverted signal at least on one pair of receiving terminals; correction of one pair of received signals—direct and inverted ones—by a single-channel differential adaptive corrector; and data recovery.

A method for the wireless capacitive signals receiving with compensation of distortion in the channel, which is also a subject of the present invention, uses the receiving apparatus embodiment 2 and consists of the following steps: positioning of the receiving apparatus against the transmitting apparatus so as to provide at least partial coverage of the working surfaces of both apparatuses' terminals, and that the working surface of the terminals of both apparatuses are separated from each other by at least one non-conductive medium; detection of the electric fields reproducing at least two signals—the direct and precompensation ones—at least on two receiving terminals; correction of at least two received signals—direct and precompensation ones—by a multi-channel single-ended adaptive corrector; and data recovery.

A method for wireless capacitive signals receiving with compensation of distortion in the channel, which is also a subject of the present invention, uses the receiving apparatus embodiment 3 and consists of the following steps: positioning the receiving apparatus against the transmitting apparatus so as to provide at least partial coverage of the working surfaces of both apparatuses' terminals, and that the working surface of the terminals of both apparatuses are separated from each other by at least one non-conductive medium; detection of the electric fields reproducing at least two pairs of signals—the direct and inverted ones and the direct and inverted precompensation ones—at each of the at least two pairs of receiving terminals; correction of at least two pairs of received signals—the direct and inverted ones and the direct and inverted precompensation ones—by a multi-channel differential adaptive corrector; and data recovery.

It is expedient to provide the aforementioned methods with the fixing the receiving apparatus and the respective transmitting apparatus on the other side of the wireless capacitive signal transmission to each other in oriented position.

It is also expedient to add the following to the above mentioned methods: amplification and/or filtering and/or delaying of at least one of two received signals—direct and inverted one—and/or decoding the recovered data signal.

It may also be advisable to provide the aforementioned methods with the production of an presence identifier signal on its side and reading of an identifier presence signal of transmitting apparatus on the other side.

The wireless capacitive signal receiving and transmission system with distortion compensation in the channel (hereinafter referred to as the capacitive signal receiving and transmission system embodiment 4), which is also a subject of the present invention, comprises at least one receiving and transmitting apparatus that consists of one transmitting apparatus, described in Embodiment 1 or 3, and a compatible receiving apparatus, described in Embodiment 1 or 3, at each side of the wireless receiving/transmission, configured so that a straight line which connects the midpoints of the working surfaces of the transmitting apparatus's terminals is approximately perpendicular to a straight line which connects the midpoints of the working surfaces of the receiving apparatus's terminals, provided that each transmitting apparatus of receiving and transmitting unit is oriented to the corresponding receiving apparatus of receiving and transmitting unit on the other side so as to ensure at least a partial coverage of relevant working surfaces of receiving and transmitting apparatuses' terminals, and the working surfaces of these apparatuses' terminals are separated from each other by at least one non-conductive medium.

The wireless capacitive signal receiving and transmission system with distortion compensation in the channel (hereinafter referred to as the capacitive signal receiving and transmission system embodiment 5), which is also a subject of the present invention, comprises at least one receiving and transmitting apparatus on each side of wireless receiving/transmission that includes: one transmitting apparatus that includes:

either a single-channel differential signal precompensator with an input for data signals being transmitted configured with the ability to generate one pair of prepared signals and one pair of direct and inverted precompensation signals on the outputs; a single-channel differential signal driver with an input for one pair of prepared signals and with an input for direct and inverted precompensation signals configured with the ability to generate one pair of direct and inverted pre-compensated signals on the outputs;

or a multi-channel single-ended signal precompensator with an input for data signals being transmitted configured with the ability to generate one prepared signal and at least one precompensation signal on the outputs, and a multi-channel single-ended signal driver with an input for one prepared signal and with an input for at least one precompensation signal configured with the ability to generate at least one direct and one precompensation signal on the outputs.

or a multi-channel differential signal precompensator with an input for data signals being transmitted configured with the ability to generate one pair of prepared signal and at least one pair of direct and inverted precompensation signal; and a multi-channel differential signal driver with an input for one pair of prepared signals and with the inputs for at least one pair of direct and inverted precompensation signals configured with the ability to generate at least two pairs of direct and inverted signals and direct and inverted precompensation signals on the outputs;

and one compatible receiving apparatus which comprises:

either a single-channel differential adaptive signal corrector, configured with the ability to correct a received signal and to recover the data, its inputs being connected to at least one pair of receiving terminals, and which has outputs for received data signals;

or a multi-channel single-ended adaptive signal corrector configured with the ability to correct received signals and to recover the data, its inputs being connected to at least two receiving terminals and which has outputs for received data signals;

or a multi-channel differential adaptive signal corrector configured with the ability to correct received signals and to recover the data, which inputs are connected to at least two pairs of receiving terminals and which has outputs for received data signals, and common terminals, in an amount of at least one pair of terminals or at least two terminals, or at least two pairs of terminals depending on the chosen configuration of the transmitting and receiving apparatuses, and a switch configured with the ability to switch the common terminals between the receiving and transmitting apparatuses in the transmitting and receiving unit;

provided that each receiving and transmitting apparatus is oriented to the corresponding receiving and transmitting apparatus on the other side so as to ensure at least a partial coverage of relevant working surfaces of common receiving and transmitting apparatuses' terminals on one side with the working surfaces of common receiving and transmitting apparatuses' terminals on the other side, and the working surfaces of these apparatuses' common terminals are separated from each other by at least one non-conductive medium.

It is expedient to include a retainer in the structure of the capacitive signal receiving and transmission system (embodiments 4-5), configured with the ability to fix transmitting and receiving apparatuses of the corresponding sides in oriented position.

A receiving and transmitting apparatus for the wireless capacitive signal receiving and transmission with distortion compensation in a channel, which is a part of the signal receiving and transmission system embodiment 4, and which is also a subject of the present invention includes: one transmitting apparatus, described in the embodiment 1 or 3, and a compatible receiving apparatus, described in the embodiment 1 or 3, configured so that a straight line which connects the midpoints of the working surfaces of the transmitting apparatus's terminals is approximately perpendicular to a straight line which connects the midpoints of the working surfaces of the receiving apparatus's terminals.

A receiving and transmitting apparatus for the wireless capacitive signal receiving and transmission with distortion compensation in a channel, which is a part of the signal receiving and transmission system embodiment 5, and which is also a subject of the present invention includes: one transmitting apparatus which includes:

either a single-channel differential signal precompensator which has an input for data signals being transmitted configured with the ability to generate one pair of prepared signals and one pair of direct and inverted precompensation signals on the outputs, and a single-channel differential signal driver which has an input for one pair of prepared signals and an input for direct and inverted precompensation signals configured with the ability to generate one pair of pre-compensated direct and inverted signals on the outputs;

or a multi-channel single-ended signal precompensator with an input for data signals being transmitted configured with the ability to generate one prepared signal and at least one precompensation signal on the outputs, and a multi-channel single-ended signal driver with an input for one prepared signal and with an input for at least one precompensation signal configured with the ability to generate at least one direct and one precompensation signal on the outputs;

or a multi-channel differential signal precompensator with an input for data signals being transmitted configured with the ability to generate one pair of prepared signals and at least one pair of direct and inverted precompensation signals; and a multi-channel differential signal driver with an input for one pair of prepared signals and with the inputs for at least one pair of direct and inverted precompensation signals configured with the ability to generate at least two pairs of direct and inverted signals and direct and inverted precompensation signals on the outputs;

and one compatible receiving apparatus which comprises:

either a single-channel differential adaptive signal corrector, configured with the ability to correct the received signal and to recover the data, with the inputs that are connected to at least one pair of receiving terminals, and the corrector having also outputs for received data signals;

or a multi-channel single-ended adaptive signal corrector configured with the ability to correct received signals and to recover the data, which inputs are connected to at least two receiving terminals and which has outputs for received data signals;

or a multi-channel differential adaptive signal corrector configured with the ability to correct received signals and to recover the data, which inputs are connected to at least two pairs of receiving terminals and which has outputs for received data signals;

and common terminals, in the amount of at least one pair of terminals or at least two terminals, or at least two pairs of terminals depending on the chosen configuration of the transmitting and receiving apparatuses, and a switch configured with the ability to switch the common terminals between the receiving and transmitting apparatuses in a receiving and transmitting unit.

BRIEF DESCRIPTION OF THE DRAWINGS

The following views of drawings, as well as a description of the examples of system's embodiments, methods and apparatuses for the wireless capacitive receiving and transmission system with compensation of the distortion in a channel, are given only to illustrate the invention being claimed and do not limit the scope of the rights defined by the claims of the invention:

DETAILED DESCRIPTION

The detailed description presented herein discloses the subjects of the invention according to the embodiments described herein, but it is obvious that different modifications can be used for each disclosure and that the principles described herein may be applied to other embodiments without departing from the scope of the present invention.

Thus, the inventions disclosed herein are not limited to the disclosed embodiments in any way.

The claimed subjects of the invention are the embodiments of systems, methods and apparatuses for the short-range wireless capacitive receiving and transmission of data signals with distortion compensation in a channel between two adjacent electronic devices.

Examples of such electronic devices may include without limitation two mobile phones, a mobile phone and a computer or a portable disk drive and a portable computer, two or more semiconductor chips that are coupled one with other in an integrated circuit or two or more layers in a micro-assembly, etc.

Systems, methods and apparatuses described herein allow transmitting data from one apparatus to another. In this case a precompensator may create a prepared signal by converting the input data into a format that enables to perform the transmission mentioned above, but in some cases there can be a repetition of a signal, inverting, scaling, etc. For example, in one embodiment, before the transmitting apparatus starts the generating signals of any data for transmission to the receiving apparatus, the data can be converted into a sequence of binary numbers, so that the actual data stream, transmitted from one device to another, is presented by a stream of digits "1" and "0". After transmitting the data is converted again to ensure that it is represented in its original form. This patent does not impose any requirements regarding the specific nature or such specific character or protocol of such or similar conversion. In one not limited embodiment, the example of a physical signal encoding, that may be used in the transmitting apparatus's precompensator, is represented by a code known as "Manchester" or "Differential Manchester".

Figure 1:
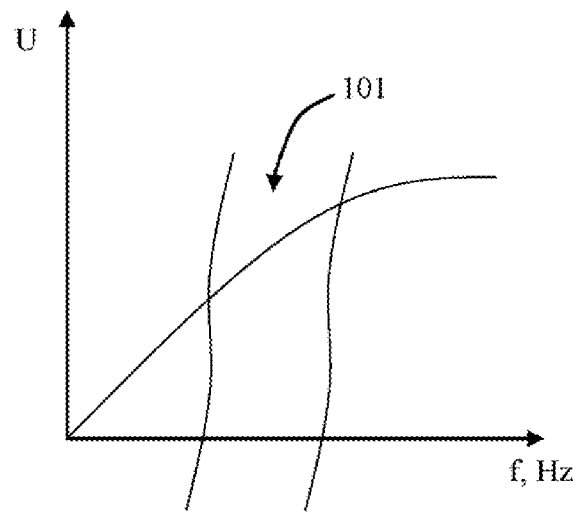
FIG. 1—frequency response chart for a typical capacitive circuit.

In general, any capacitive coupling is a capacitive-resistive voltage divider with the frequency response curve (FIG. 1) where the working area 101 is limited on the lower frequencies by a low level of signal on the receiving terminals and on the higher frequencies by system's response speed. Slope of the frequency response curve is largely determined by the capacity between the terminals of the transmitting and receiving apparatuses, which in turn depends on the design of terminals, the distances between them, the characteristics of non-conductive material which is filling the space between the terminals, etc. At the same time the transmitting terminals are the conductive elements which have an input that feed a signal through the input feed point to the conductive working surface which may have any shape and is designed with the ability to generate electric fields. In their turn, the receiving terminals are the conductive elements which have an output that tap a signal through the output feed point from the conductive working surface which may have any shape and is designed with the ability to detect electric fields.

Figure 2:
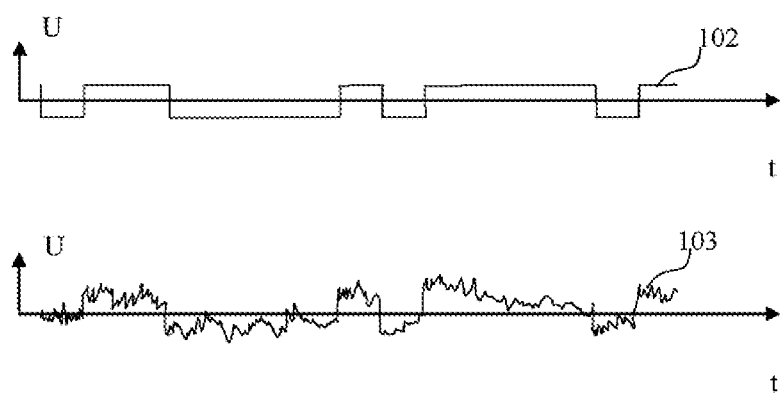
FIG. 2—diagram of the received signal with distorted form that was transmitted capacitively through a non-conductive medium.

The transmitted data signal 102, while going through link of a non-uniform frequency response curve, undergoes certain changes, i.e. changes in the distortion of the signal waveform, and the longer the pulse length (for transmitting binary signals), the more significant decline in amplitude at the end of the pulse 103 (FIG. 2), which may lead to the increase of errors in the channel, significant or complete distortion of data being transmitted, or even to the complete loss of communication.

This patent describes systems, methods and apparatuses that provide compensation of distortions in the capacitive coupling channel mainly due to the precompensation on the transmitting side and the adaptive correction on the receiving side. Furthermore, by using the differential transmission through the capacitive communication channel and placing rejection groove into the area of terminals, one can achieve considerable compensation of external influences.

The essence of precompensation lays in generation of additional signals depending on the character of the stream data, which is feed to the input of transmitting apparatus, wherein certain precompensation signals are generated at intervals of the main signal with more than one clock period of the same logic level. These additional signals are combined with the main signal in the circuit of capacitive connection on the positions of the driver circuits of the transmitting apparatus to the adaptive corrector of the receiving apparatus, after the reproduction of signals at its receiving terminals.

The signal driver, in general, performs the function of a particular gain of precompensation signals and prepared signals respectively to the certain weight coefficient, and can combine the signals, matching them with the terminals, etc.

However, depending on the embodiment of the system, the transmitting apparatus or the method, signal precompensation may be performed in different ways. For example, in one embodiment, the precompensation of a signal being transmitted takes place exactly in a signal driver, wherein the precompensation signal is added to the main signal, and thus pre-compensated signal is generated on the output of the driver, and thus on the transmitting terminal. In another embodiment, the precompensation signal or signals are transmitted simultaneously with the main signal via at least one additional capacitive channel of wireless connection that is identical to the main channel and set to transmit precompensation signals.

In general, the adaptive signal corrector in the receiving apparatus generates the received data on the output due to the correction and the signal dependent data recovery principle, using a clock signal. In this case, there also may be subtraction of induced in-phase interference from the received signals in the differential embodiments of the adaptive corrector.

In other embodiments, one can use such a work algorithm for the adaptive signal corrector when it generates the received data on the output by restoring data from a received signal and at least one received precompensation signal. In this case a recovered clock signal also can be used.

Figure 3:
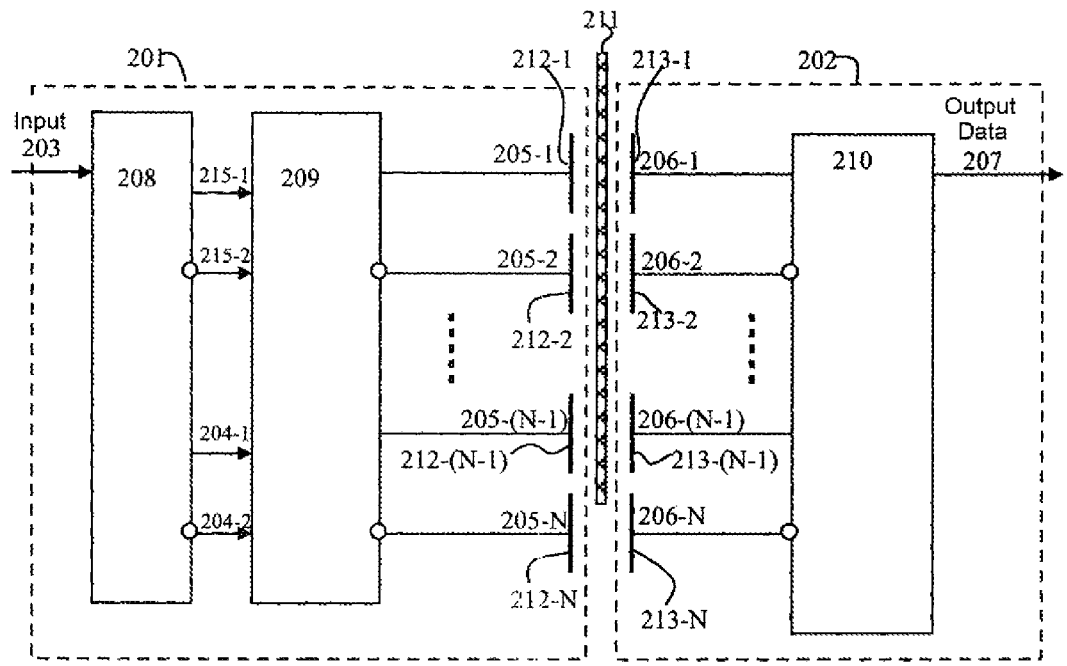
FIG. 3—a block diagram of transmitting and receiving apparatuses in the wireless capacitive receiving and transmission system using single-channel differential receiving and transmitting apparatuses.

In one possible embodiment (FIG. 3) the wireless capacitive signal receiving and transmission system with distortion compensation in a channel (hereinafter referred to as the System) comprises a transmitting apparatus 201, which consists of a single-channel differential signal precompensator 208, a single-channel differential signal driver 209 and at least one pair of spaced-apart transmitting terminals 212; a receiving apparatus 202, which consists of a differential adaptive corrector 210 and at least one pair of spaced-apart receiving terminals 213. Providing that, one must meet the requirements, that the transmitting and receiving apparatuses are oriented so as to provide at least partial coverage of the terminals' working surfaces of both apparatuses. Thus, the working surface of each of the terminals 212 must be oriented opposite to the corresponding working surface of terminals 213 with a certain, at least partial coverage. In addition, it is necessary to ensure that the respective oriented terminals' working surfaces of both apparatuses are separated from each other by at least one non-conductive medium 211. The mutual orientation of the respective terminals' working surfaces of both apparatuses ensures the capacitive coupling between them.

The operation of the system (FIG. 3) is described below: when feeding data to the transmitting apparatus 201, a single-channel differential signal precompensator 208, depending on the input signal 203, produces one pair of differential prepared signals 215-1, 215-2, and direct 204-1 and inverted 204-2 precompensation signals that are combined with the prepared signals 215 by a single-channel differential driver 209, thereby forming direct 205-1 and inverted 205-2 pre-compensated signals. At least one pair of spaced-apart transmitting terminals 212-1 and 212-2, when feeding them a direct 205-1 and inverted 205-2 pre-compensated signals, creates corresponding electric fields, which represent direct and inverted pre-compensated signals. After appropriate orientation and placement of the receiving apparatus 202 with respect to the transmitting apparatus 201, receiving terminals 213-1 and 213-2 can detect electric fields that reproduce the direct 206-1 or inverted 206-2 signal. Differential input signals 206, being influenced by the capacitive communication channel and external factors such as electromagnetic interference that may occur during wireless signal transmission, are corrected by a single-channel differential adaptive corrector 210, which partially or completely eliminates the influence of external factors and produces an output data signal 207.

The alternative embodiment of the System (FIG. 3) is designed for the wireless unidirectional data transmission from the transmitting apparatus 201 to the receiving apparatus 202. In other embodiments of the System one can also add a circuit for data transmission in the reverse direction or a bidirectional or multidirectional transmission circuit, etc. The system can also be used to transmit signals which are separated with time, code or frequency method, but not limited to these methods, by encoding input data in a precompensator of the transmitting apparatus and decoding the recovered data obtained by the receiving apparatus in the adaptive signal corrector.

In some embodiments of the System the transmitting and receiving apparatuses can be implemented in an integrated form, for connection between semiconductor chips or between layers in a micro-assembly. In other embodiments, e.g. for communication between different devices, these apparatuses may include a printed circuit board and several integrated circuits, etc., or be configured as specialized semiconductor chips or modules.

Figure 4:
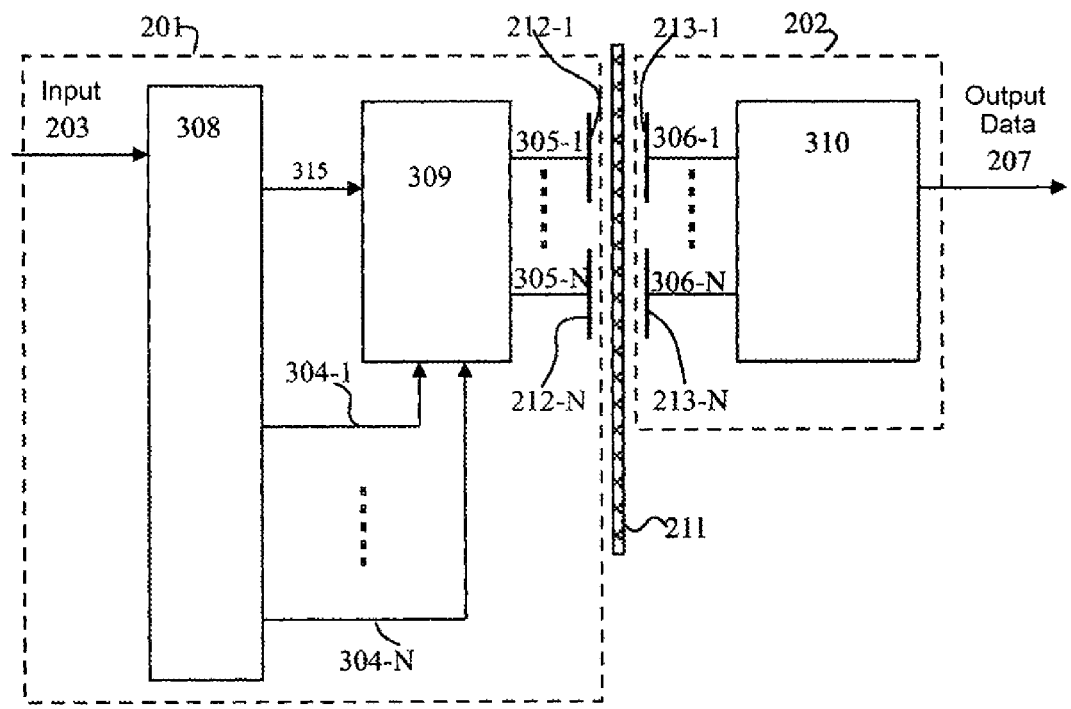
FIG. 4—a block diagram of transmitting and receiving apparatuses in the wireless capacitive receiving and transmission system using multi-channel single-ended receiving and transmitting apparatuses.

In another possible embodiment (FIG. 4) the System may comprise the transmitting apparatus 201, which consists of a multi-channel single-ended signal precompensator 308, a multi-channel single-ended signal driver 309 and at least two spaced-apart transmitting terminals 212; a receiving apparatus 202, which consists of a multi-channel single-ended adaptive corrector 310 and at least two spaced-apart receiving terminals 213. Providing that, one also must meet the requirements of mutual orientation, i.e. the transmitting and receiving apparatuses must be oriented so as to provide at least partial coverage of the terminals' working surfaces of both apparatuses. Thus, the working surface of each of the terminals 212 must be oriented opposite to the corresponding working surface of terminals 213 with a certain, at least partial coverage. In addition, it is necessary to ensure that the respective oriented terminals' working surfaces of both apparatuses are separated from each other by at least one non-conductive medium 211. The mutual orientation of the respective terminals' working surfaces of both apparatuses ensures the capacitive coupling between them.

The operation of the System (FIG. 4) is described below: when feeding data signals (signals) 203 to the transmitting apparatus 201, depending on the input signal 203 and with the help of methods described above but not limited to them, the formation of precompensation signals 304 on the output of multi-channel single-ended signal precompensator 308 and the formation of one prepared signal 315 of input signal 203 occur. The signal driver 309 generates at least one direct signal and one precompensation signal 305, which then are feed to at least two spaced-apart transmitting terminals 212, each generating a corresponding electric field, which represent a direct signal and a precompensation signal. After orientation of the receiving apparatus 202 with respect to the transmitting apparatus 201 with at least partial coverage of the working surfaces of both apparatuses and ensuring the separation of the working surfaces of these apparatuses one from another at least by one non-conductive medium 211, receiving terminals 213 can detect electric fields which reproduce at least two signals—the direct signal and the precompensation signal 306—on each of two receiving terminals 213.

After the appropriate signal correction 306 and the partial or complete elimination of the influence of some external factors, e.g. electro-magnetic interference, on the signal, the multi-channel single-ended adaptive corrector 310 recovers and generates the output data signal 207, considering possible use of the recovered clock signal.

Also, the above System can be used to transmit signals which are separated by time, code, or frequency method, but not limited to these methods, by encoding input data in precompensator of transmitting apparatus and decoding of the recovered data obtained by the receiving apparatus in the adaptive signal corrector.

Figure 5:
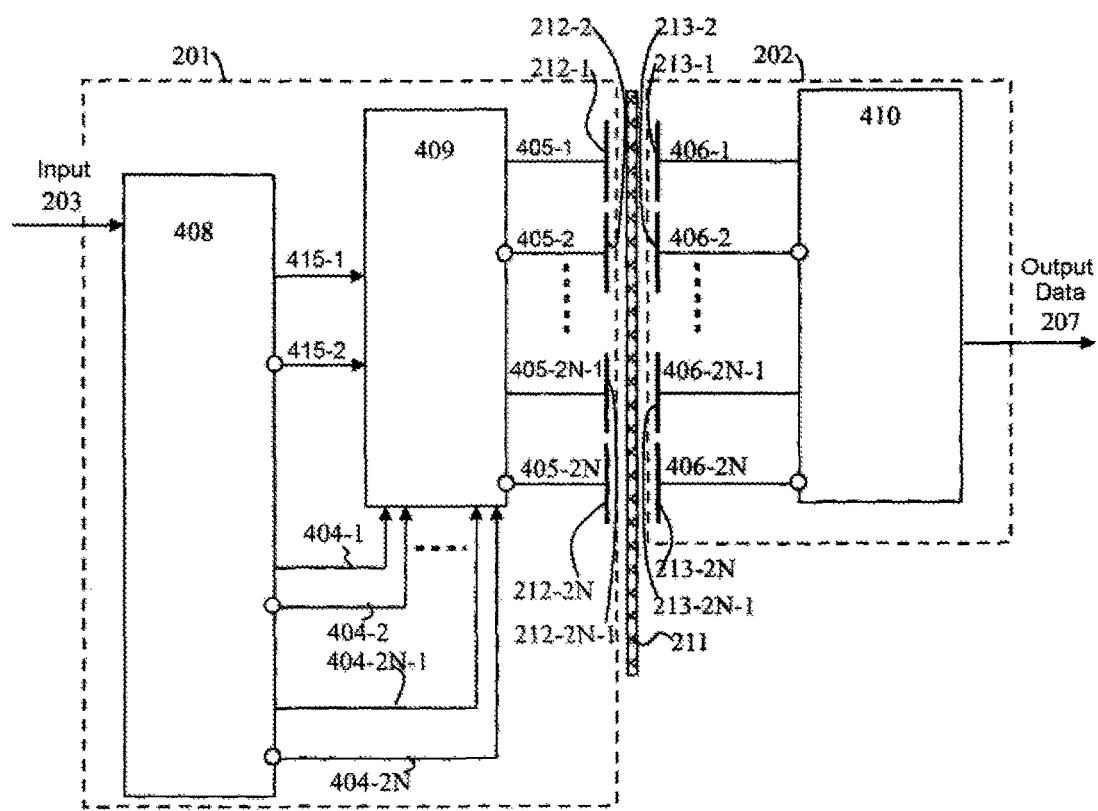
FIG. 5—a block diagram of transmitting and receiving apparatuses in the wireless capacitive receiving and transmission system using multi-channel differential receiving and transmitting apparatuses.

There is another possible embodiment of the System (FIG. 5) which may comprise a transmitting apparatus 201, which consists of a multi-channel differential signal precompensator 408, a multi-channel differential signal driver 409 and at least two pairs of spaced-apart transmitting terminals 212; a receiving apparatus 202, which consists of a multi-channel differential adaptive corrector 410 and at least two spaced-apart receiving terminals 213. Providing that, one also must meet the requirements of mutual orientation, i.e. the transmitting and receiving apparatuses must be oriented so as to provide at least partial coverage of the terminals' working surfaces of both apparatuses. Thus, the working surface of each of the terminals 212 must be oriented opposite to the corresponding working surface of terminals 213 with a certain, at least partial coverage. Moreover, the oriented working surfaces of the terminals of the both apparatuses must be separated from each other by at least one nonconductive medium. The mutual orientation of the respective terminals' working surfaces of both apparatuses ensures the capacitive coupling between them.

The operation of the System (FIG. 5) is described below: when feeding data signal (signals) to the transmitting apparatus 201, depending on the input signal 203 and with the help of one of the methods described above but not limited to them, the formation of differential precompensation signals 404 and the formation of one pair of differential prepared signals 415-1 and 415-2 of the input signal 203 occur on the output of multi-channel differential signal precompensator 408. The multi-channel differential signal driver 409 generates at least two pairs of signals—direct and inverted signals and direct and inverted precompensation signals. Then these signals are fed to at least two pairs of spaced-apart transmitting terminals 212, each one generating a corresponding electric field, which represents direct and inverted signals and direct and inverted precompensation signals. After orientation of the receiving apparatus 202 to the transmitting apparatus 201 with at least partial coverage of terminals' working surfaces of both apparatuses and meeting the conditions of separation of working surfaces of these devices between each other with at least one nonconductive medium 211, the receiving terminals 213 can detect electric fields which reproduce at least two pairs of signals 406—the direct and inverted signal and the direct and inverted precompensation signal—on at least two pairs of receiving terminals.

After the appropriate signal correction 406 and the partial or complete elimination of the influence of some external factors, e.g. electro-magnetic interference on the signal form, the multi-channel single-ended adaptive corrector 410 restores and generates the output data signal 207, with the possible use of recovered clock signal.

The system can also be used to transmit signals which are separated by time, code or frequency method, but not limited to these methods, by encoding input data in precompensator of transmitting apparatus and decoding the recovered data obtained by the receiving apparatus in the adaptive signal corrector.

Also for the embodiments of Systems which comprise on each side of the wireless receiving/transmission at least one transmitting and one receiving apparatus, where the pairs of differential signals are transmitted in the channel or channels of capacitive coupling, one may use such mutual arrangement of terminals at which the straight line which connects the midpoints of the working surfaces of transmitting apparatus's terminals is perpendicular or approximately perpendicular to the line which connects the midpoints of the working surfaces of the receiving apparatus. Also, when each of the midpoints of receiving terminals are equidistant to the midpoints of both terminals of transmitting pair, there occurs the compensation of the signals radiated by transmitting terminals, and induced to the working surfaces of receiving terminals.

For all above systems one can use a retainer, configured with the ability to fix transmitting and receiving apparatuses of the corresponding sides in oriented position. In this case the retainer may be of magnetic, mechanical, pneumatic or other principle implementation, etc. (not shown).

Figure 6:
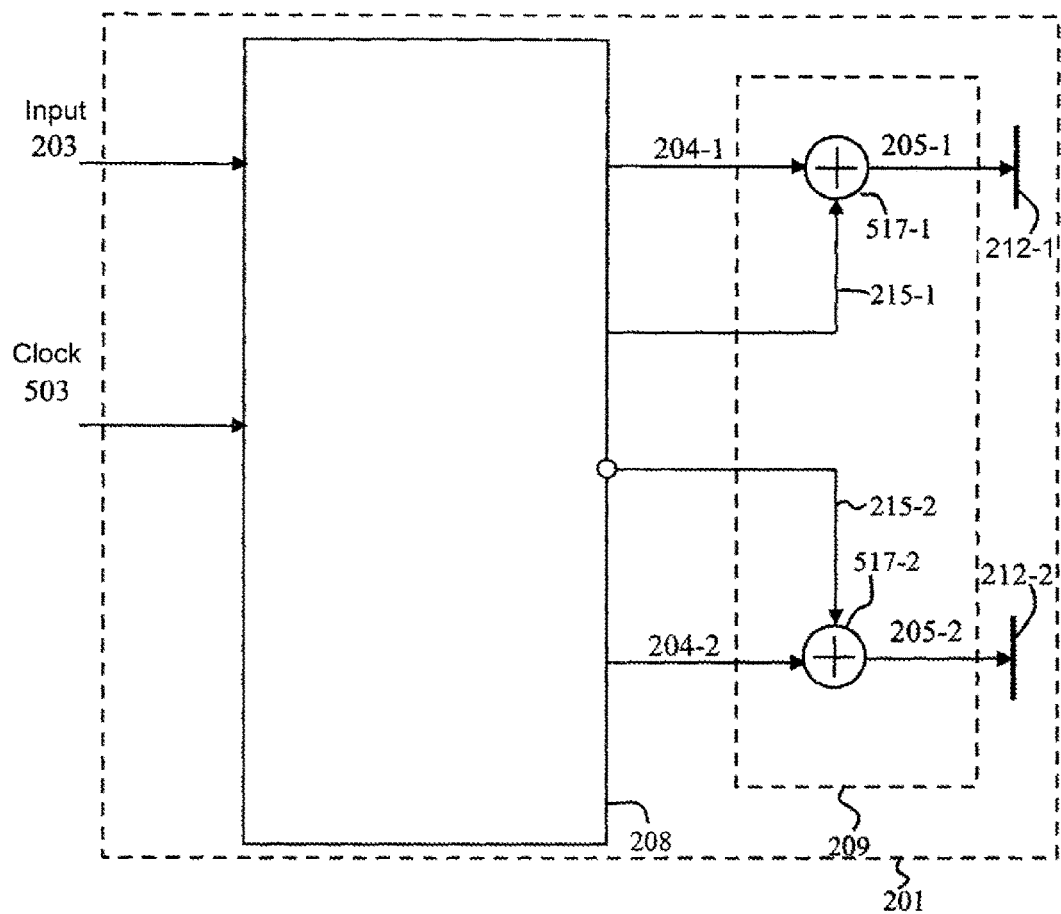
FIG. 6—a block diagram of some embodiment of the single-channel differential transmitting apparatus.
Figure 7:
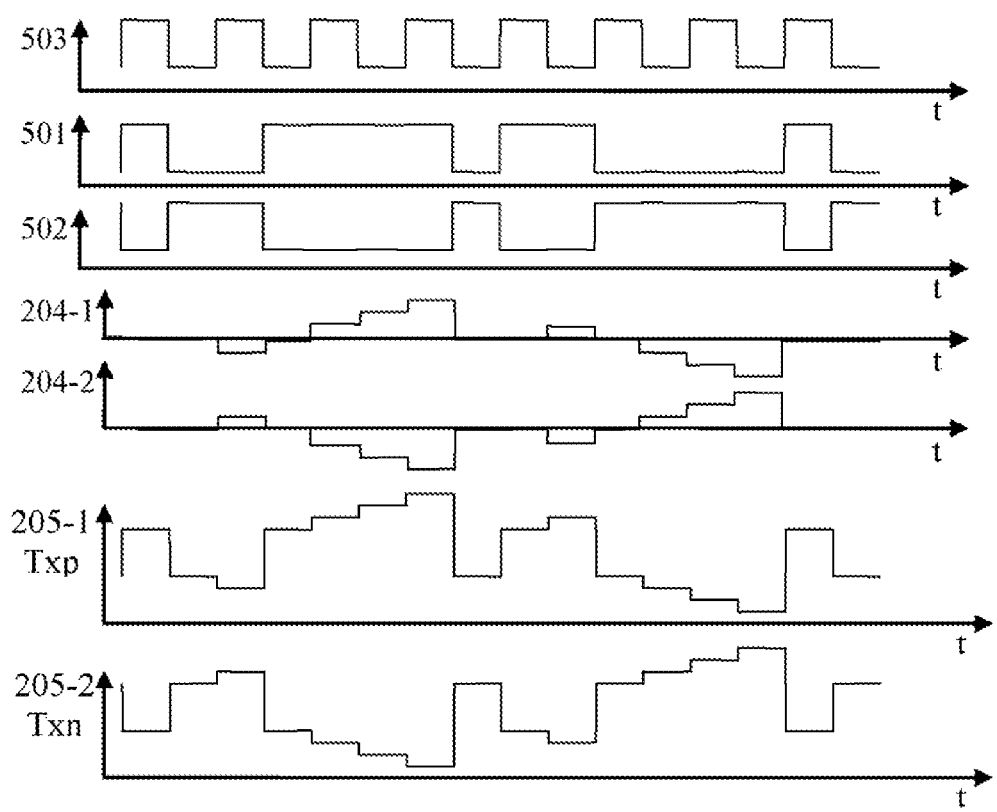
FIG. 7—charts illustrating the operation of the single-channel differential transmitting apparatus according to FIG. 6.

There is another possible and not limited hereto embodiment of the transmitting apparatus 201 (FIG. 6), which is used in the System (FIG. 3), where the transmitting apparatus 201 consists of a single-channel differential signal precompensator 208, a single-channel differential signal driver 209, and two spaced-apart transmitting terminals 212-1 and 212-2. Schemes (FIG. 7) provide the additional explanation of the work of this apparatus 201.

The single-channel differential signal precompensator 208 compares the prepared signal 215 with the clock signal 503 to determine the duration width of logic symbols and generates precompensation signals, direct 204-1 and inverted 204-2 ones, which are combined with direct 215-1 and inverted 215-2 prepared signal in adders 517, which are the part of the single-channel differential driver 209. As a result, the output signals 205-1 and 205-2 have the increased amplitude with every next bit with the same logical level as the preceding bit—with level "1"; and decreased amplitude with every next bit with the same logical level as in the preceding bit—level "0".

The single-channel differential precompensator 208 and the single-channel differential driver 209 in other embodiments may have additional components, e.g. a data encoding unit, a DAC, amplifiers of precompensation output signal, a delay line for time shifts equalizing between the main signal and precompensation signals, filters for limiting the signal spectrum, a rejection groove, etc. Also the transmitting apparatus 201 in all embodiments may be composed of additional units, such as a serializer unit, a DAC, an aggregation unit with other transmitting devices, an interface and/or coordination unit with external systems, an interface and/or coordination unit with external standard communication interface, etc. Some elements and units can be replaced by similar or those which have similar functions in combination with other units/elements, for example, operational amplifiers together with inverters instead of adders, etc., but without leaving the context of this invention.

Figure 8:
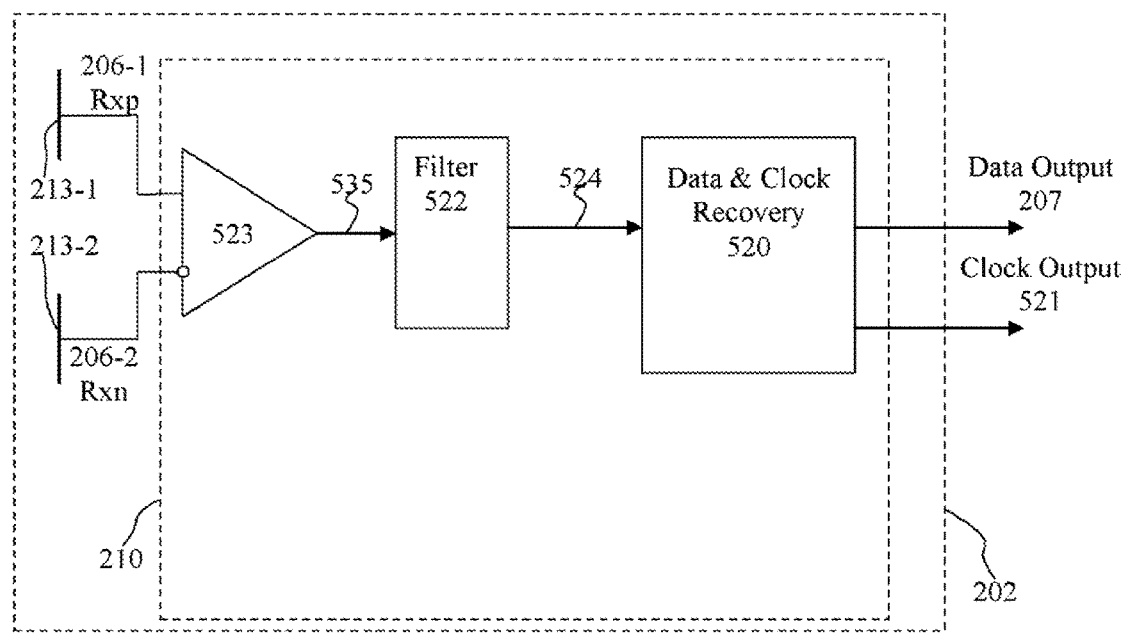
FIG. 8—a block diagram of an embodiment of the single-channel differential receiving apparatus.

In one of the possible but not limited hereto embodiments of the receiving apparatus (FIG. 8) the receiving apparatus 202 may comprise two spaced-apart receiving terminals 213-1 and 213-2 and a single-channel differential adaptive corrector 210 in which the received differential signal 206 can be amplified in a differential amplifier 523, which eliminates the induced in-phase electromagnetic interference. In certain not limited embodiments a filter 522 may be configured, for passing a frequency band, and for additional correction of a waveform. In some embodiments a filter may be placed in front of an amplifier 523 or to be combined with an amplifier, etc. A data and clock recovery unit 520, using a clock signal generated by a clock recovery circuit, reproduces the form of the output data signal 207 that is close to the shape of the signal fed to the input of the transmitting apparatus due to the precompensation components in the received signal, which also reduces data jitter on the output of the apparatus. In one embodiment the recovery of the clock signal may be implemented with the help of introduction of signal generator with a phase-locked loop which synchronizes it with the input signal 524; in addition, to ensure the circuit operation, the signal of recovered clock synchronization may be fed to the frequency dividers and/or multipliers, delay lines, phase shifters, additional amplifiers, etc. The clock signal output 521 may be present if necessary, for further data processing, and in some not limited embodiments the adaptive corrector can only recover a clock signal for its operation.

In one not limited embodiment the data recovery may be performed due to the work of a logic circuit that would change its state at a particular changed level of the input signal after the signal positive and/or negative edge for recovered clock synchronization: for example, it can be a D-trigger circuit, etc. Also, in any embodiments, the receiving apparatus 202 may comprise the additional units such as a DAC, a recovered data signal decoding unit and/or an interface unit and/or a matching unit with external systems, an interface and/or matching unit with standard external communication interface, a delay line, a filter, an amplifier of at least one of signals, ie. a received direct and inverted signal, a clock recovery unit from the received data signal, deserializer unit, an aggregation unit with other receiving apparatuses, a rejection groove.

Figure 9:
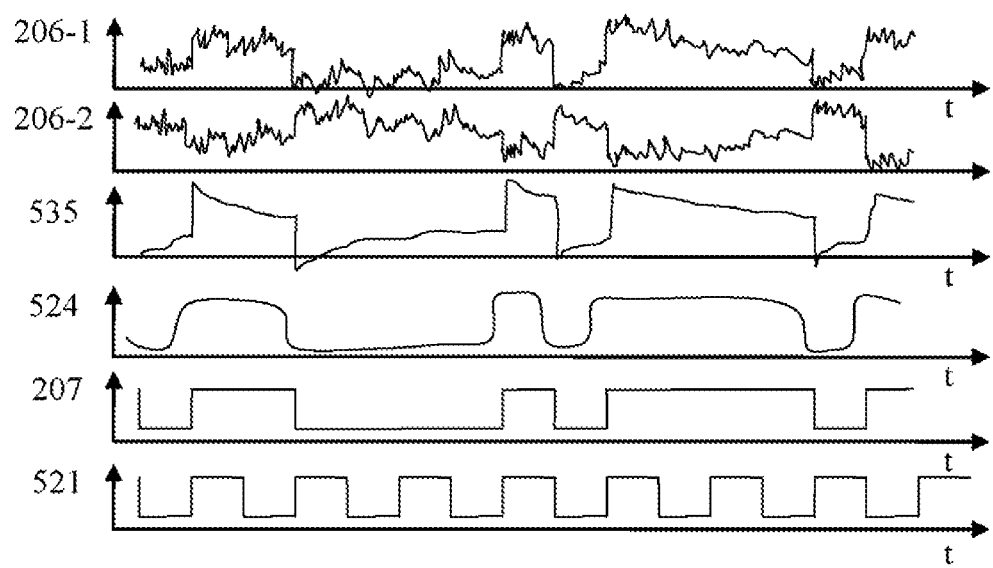
FIG. 9—diagrams illustrating the operation of the single-channel differential adaptive corrector.

The diagrams (FIG. 9) describe the operation of this differential adaptive corrector and show a possible form of input signals 206-1 and 206-2, a waveform after amplification and elimination of the induced in-phase noise 535, a signal after filtering and correction 524, data 207 and a clock synchronization signal 521 recovered with a help of a data and clock recovery unit 520.

Figure 10:
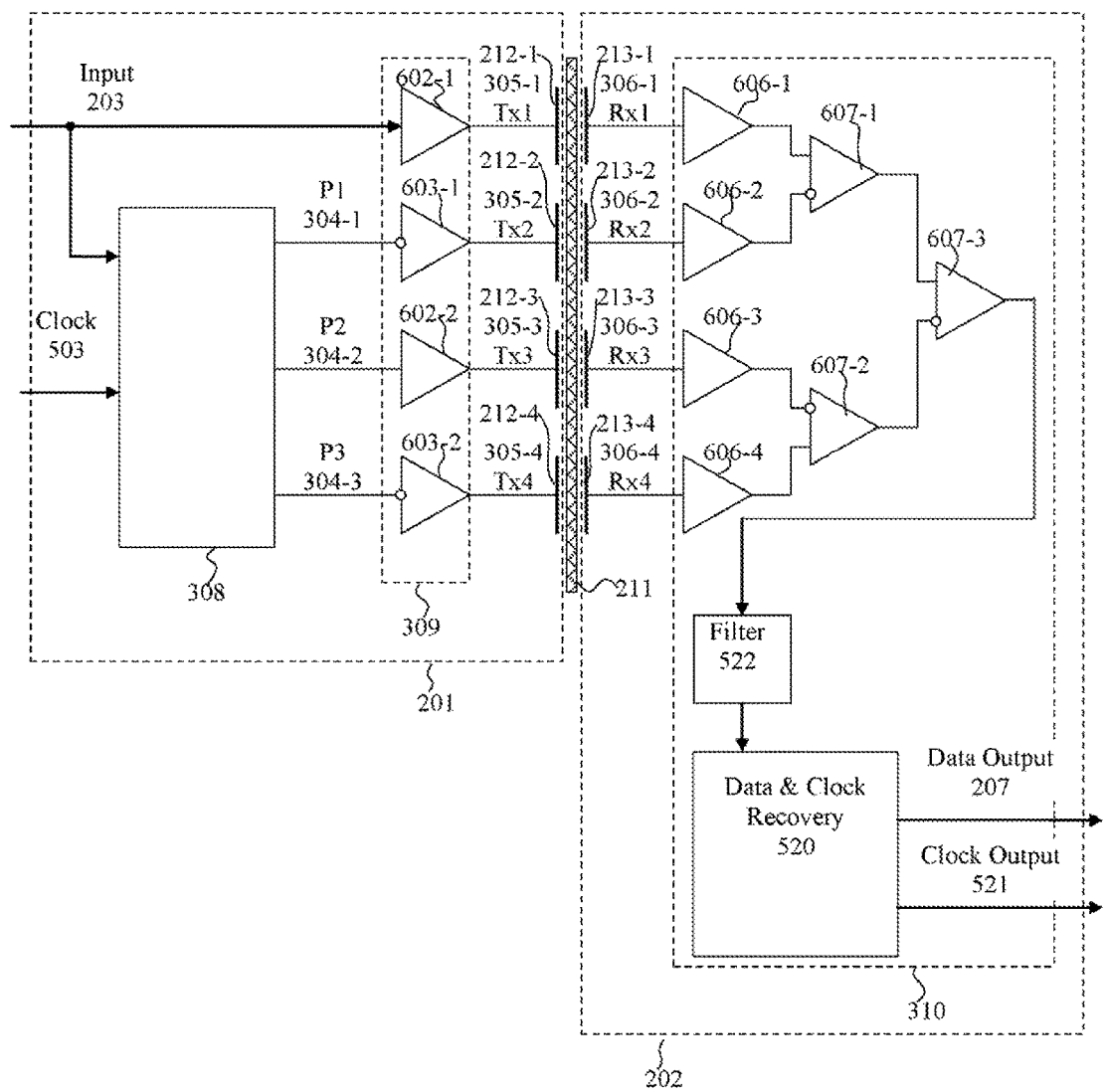
FIG. 10—a detailed block diagram of some embodiment of the multi-channel single-ended transmitting and receiving apparatus of the wireless capacitive receiving and transmission system.
Figure 11:
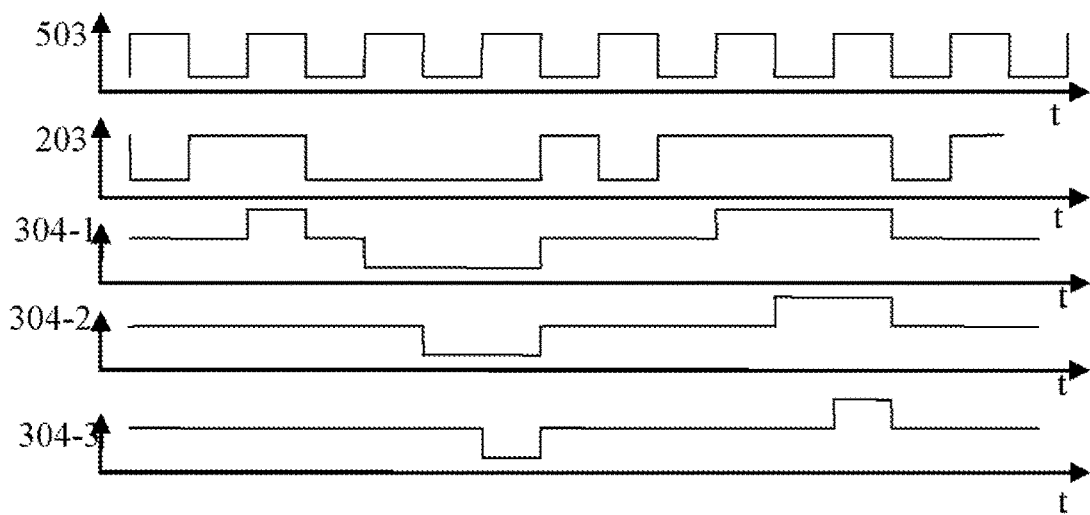
FIG. 11—diagrams illustrating the operation of the multi-channel single-ended signal precompensator.

In one not limited embodiment of the transmitting and receiving apparatus (FIG. 10) which may be a part of another embodiment of the wireless capacitive receiving and transmission system, a transmitting apparatus comprises a multi-channel single-ended signal precompensator 308, a multi-channel single-ended signal driver 309 and four spaced-apart transmitting terminals 212-1-212-4, whereas the receiving apparatus 202 comprises four spaced-apart receiving terminals 213-1-213-4 and a multi-channel single-ended adaptive corrector 310. The distortion compensation occurs due to a multi-channel single-ended precompensator 308, which compares a prepared signal 315, generated from an input signal 203, with a clock signal 503 to determine the duration width of logic symbols and generates precompensation signals 304-1, 304-2, and 304-3, so that the received precompensation signals and data 306 of the receiving apparatus will couple with each other in a certain order in the adaptive corrector 310 to compensate the distortion in a channel. The schemes (FIG. 11) describe the operation of this not limited embodiment of a multi-channel single-ended precompensator 308. The required level of precompensation for this embodiment can be achieved, for example, with a change in the amplitude of the precompensation signal 304, or with a change in the gain of the amplifiers 602, 603 and 606, etc. A multi-channel single-ended signal driver 309, which in this case consists of the amplifiers 602 and the amplifier-inverters 603, generates the output signals 305-1-305-4 so that at the receiving unit, during signal integration, there is a suppression of the induced in-phase electromagnetic interference in addition to the channel distortion compensation. For example, in this embodiment, a signal on the output of a signal recovery unit 608 is a sum of a prepared signal 315 and the precompensation signals 304, which are transmitted by the transmitting devices and received by the receiving devices with certain weight coefficients, which are defined by the amplifiers and will have a partially distorted form at least due to the loss in the capacitive coupling channel. The output signal is generated by summation of the above signals but also this may be achieved due to the inversion of some of these signals onto the transmitting side and the mutual subtraction in a certain order onto the receiving side by means of the differential amplifiers which may be included in the signal recovery unit 608, but not limited thereto. Moreover, some signals on the receiving side may be delayed using delay lines, etc, to equalize the possible time shifts.

In the general case, one can use any signal form correction circuit, wherein due to the transmission of a primary signal and the precompensation signals there are the required correction of form of a signal being distorted in the channel of the capacitive coupling and the suppression of electromagnetic interference induced on the receiving side.

Figure 12:
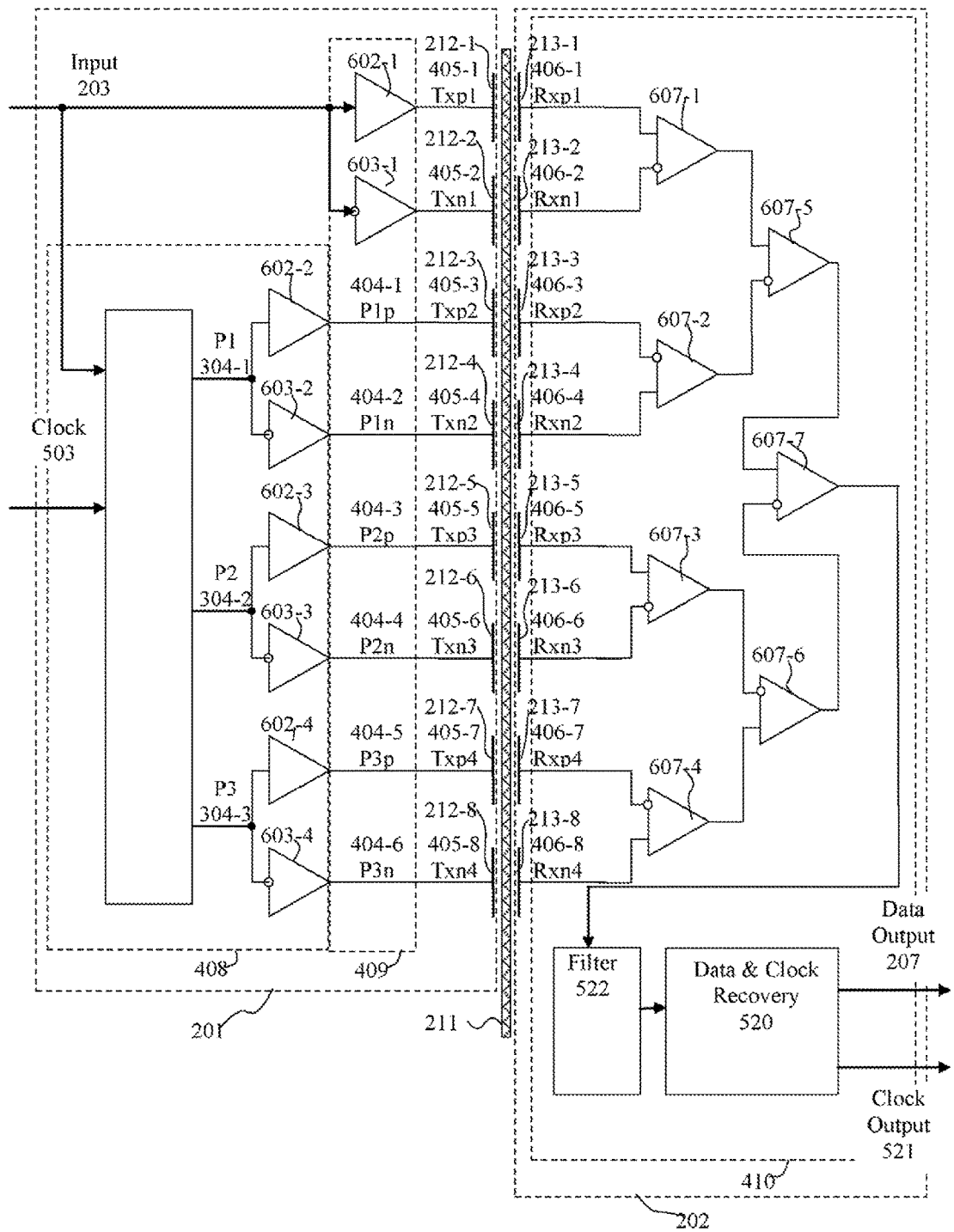
FIG. 12—a detailed block diagram of some embodiment of the multi-channel differential transmitting and receiving apparatus of the wireless capacitive receiving and transmission system.

The another embodiment of the transmitting and receiving apparatus (FIG. 12) differs from the previous ones in that in a transmitting apparatus 201 which comprises a multi-channel differential signal precompensator 408, a multi-channel differential signal driver 409 and four spaced-apart pairs of transmitting terminals 212-1-212-8, the direct and inverted copy of every prepared and precompensation signal is generated in the multi-channel differential signal precompensator 408 with the help of amplifier-invertors 603 and amplifiers 602. In the multi-channel differential signal driver 409 these signals can be amplified up to a certain level with the help of amplifiers 604. Thus, the output signal 405-1-

405-8 comprises the differential pair of primary signal and precompensation signals. Formation of pre-compensation signals in this not limited embodiment of the apparatus may occur with the help of one of the methods described herein. In the receiving apparatus 202, consisting of four spaced apart pairs of receiving terminals 213-1-213-8 and the multi-channel differential adaptive corrector 410, there is the influence decrease of the induced in-phase noise in the multi-channel differential adaptive corrector 410 due to amplification of every pair of input signals 406 by means of differential amplifiers 607. In the general case, one can use any signal filtering/correction scheme, wherein the differential signal pairs—both primary and precompensation ones—are formed on the transmitting side and there is processing of every signal pair on the receiving side with the aim to eliminate the in-phase noise and to ensure the necessary correction.

Amplifiers used both to amplify signals and to create the desired level of precompensation, depending on the specific implementation requirements, may be with a fixed gain as well as with variable one, providing that the gain change may occur due to feedbacks as well as it may be adjusted, for example, with a logic circuit, etc. for what the receiver may have an additional controlling input.

Figure 13:
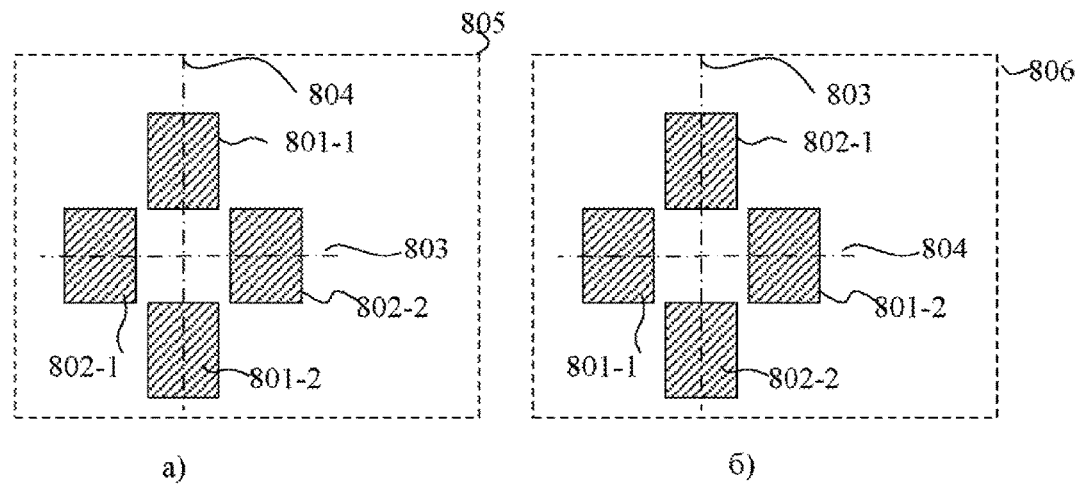
FIG. 13—(a and b)—a view of the relative positioning of the working surfaces of the differential pairs of transmitting and receiving terminals, where the straight line connects the midpoints of working surfaces of transmitting terminals and is approximately perpendicular to the line connecting the midpoints of the working surface of receiving terminals.

In the embodiments of the system wherein the differential signals are used for transmission in the capacitive coupling channel, for some not limited embodiments, in the transmitting and receiving apparatuses belonging to the one of the sides of the wireless receiving and transmission, it is possible to place the terminals (FIGS. 13 *a* and *b*) in such a way that the line of symmetry of the working surfaces 804 of a pair of receiving terminals 801 is perpendicular or nearly perpendicular to the line of symmetry of the working surfaces 803 of a pair of transmitting terminals. In other embodiments, when the shapes of terminals' working surfaces are not symmetric, instead of symmetry orientation it is possible to place the terminals in such a way that the straight lines passing through the midpoints of the terminals or the input and output feed points of signals from the terminals, etc. are perpendicular or nearly perpendicular. When each of the midpoints of receiving terminals are equidistant to the midpoints of both terminals of transmitting pair, there occurs the compensation of the signals radiated by the transmitting terminals, and induced to the working surfaces of receiving terminals. Thus, a significant decrease in certain distortion of signals reproduced on the receiving terminals of the receiving apparatus is achieved. Providing that, the coexistence of receiving and transmitting apparatuses on one side of the receiving/transmission of the described system becomes efficient due to the compensation of the above distortions.

Figure 14:
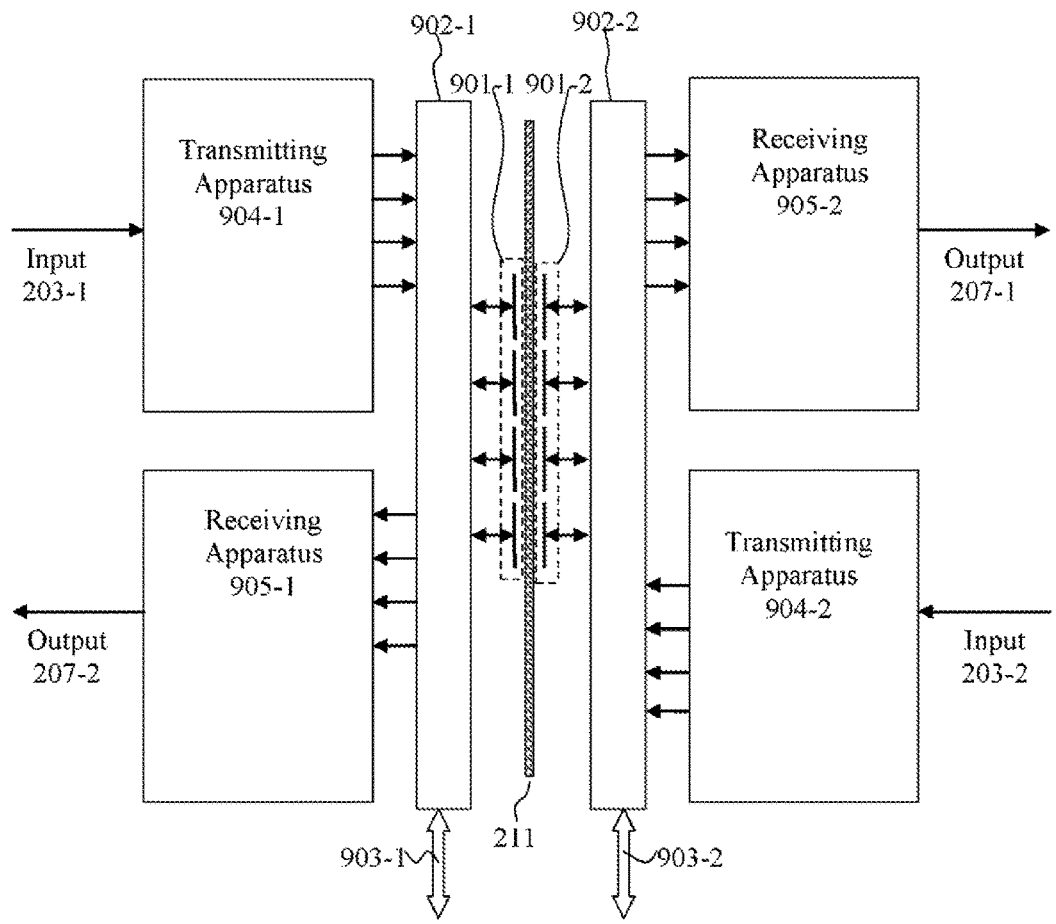
FIG. 14—a block diagram of receiving and transmitting devices using common terminals of the wireless capacitive receiving and transmission system.

It is also possible to introduce not limited in any way System embodiment with at least two transmitting and receiving apparatuses (FIG. 14), which comprise common terminals 901. Transmitting and receiving apparatuses consist of the receiving apparatuses 905, the transmitting apparatuses 904, a terminal switch 902 and the common transmitting and receiving terminals 901. Terminals switching to the receiving apparatus 905 or to the transmitting one 904, depending on the direction of receiving and transmission, is performed by the switch 902 which ensures the terminal switching using external control signals 903, e.g. from a logical device (which is not shown), in any known way.

In some embodiments, but not limited to them, transmitting 904 and receiving 905 apparatuses may be represented by the apparatuses described herein that differ in the absence of the terminals in their structure, instead of which the common terminals 901, switched by a switch 902, are used in the receiving and transmitting apparatus. In other embodiments it is possible to use additional components; e.g. they may comprise data coding/decoding units, amplifiers, filters and/or signal delay lines, etc.

Also, in some embodiments, but not limited to them, it is possible to combine several terminals by connecting them to the appropriate output of the transmitting apparatus's driver or to the input of the receiving apparatus's adaptive corrector using both the parallel switch connection of the inputs or outputs of such terminals and the other connection circuits, for example when the terminals that are not used in certain modes can be commutated to the ground, etc. In one embodiment, to ensure the necessary mode, the switch with a control signal 903 switches the specific terminals, selected from the general array (or matrix) of common terminals by connecting them in parallel, and thereby provides the change in the total effective surface area of terminals, necessary for this mode, and respectively, the change in signal capacity being transmitted and/or the level of received signal, but not limited thereto.

In some embodiments, together with the receiving and/or transmitting apparatus(es) a retainer may be used for fixing in oriented position the respective apparatuses, after alignment them with one another. Fixation of the apparatuses may be made in any known manner, for example with the help of a magnetic field, e.g. by using permanent magnets or using a vacuum pump, mechanical fixing, etc. Also, transmitting and/or receiving apparatuses may comprise contactless power transmission apparatus(es) and/or a contactless power receiving apparatus, wherein there may be a contactless transmission of power supply in any known way from one device to another after the orientation of the respective apparatuses. The power supply transmission can be performed with the help of the transmitting terminals, whereas the power supply receiving can be performed respectively with the help of the receiving terminals, but not limited thereto.

In some embodiments, the receiving and/or transmitting apparatuses can produce a presence signal and/or to determine the apparatus's presence signal on the other side of the wireless receiving/transmission. As a presence identifier and a presence identifier sensor, which may be on different sides of the wireless receiving/transmission, the following pair can be used: permanent magnet and a Hall-effect sensor, but not limited to these. Also, the permanent magnet can be used simultaneously as a retainer and as an identifier of presence. Thus, the method of determining the presence of the receiving apparatus of the other side of receiving/transmission in the transmitting device, for example, may include: after the orientation of the receiving apparatus, for example, comprising a permanent magnet functioning as a presence identifier to the transmitting apparatus, for example, comprising a Hall sensor, with triggering of a Hall sensor, and producing a corresponding control signal, the data transmitting may begin, which may be preceded by the power supply to the respective units, if they were not involved before, but not limited to the above. Also by analogy, the method of determining the presence of the transmitting apparatus of the other side of receiving/transmission in the receiving apparatus, for example, may include: after the orientation of the transmitting apparatus, for example, comprising a permanent magnet functioning as a presence identifier to the transmitting apparatus, for example, comprising a Hall sensor, with triggering of a Hall sensor, and producing a corresponding control signal, the data receiving may begin, which may be preceded by the power supply to the respective units, if they were not involved before, but not limited to the above.

Also receiving and/or transmitting apparatuses may have an identifier for generating a configuration and/or access signal, and a sensor for detecting a configuration and/or access identifier signal to the apparatus on the other side. In one not limited embodiment of the identifier for generating the configuration and/or access signal a set of permanent magnets may be used which different poles are deployed so as to generate, with the help of a magnetic field, a certain fixed code which may contain information about the type of the connected device, contain data for the data interface configuration or access permission data, but not limited thereto. As the sensor to determine the identifier and/or access configuration signal may be used a corresponding defined Hall effect sensor array, which would be oriented to the respective magnets on the other side of the wireless receiving/transmission, in case of the mutual orientation of the receiving apparatus to the transmitting one or in case of two receiving and transmitting apparatuses on at least two sides of a wireless data exchange. Such Hall effect sensor array configured with the ability to detect the magnetic field created by the appropriate identifier can decode a code created by identifier's magnets at the end of the orientation process. However, an expert in this field understands that the configuration and/or access identification unit, on both sides of the wireless receiving and transmission system, can be represented with any wireless exchange system of relatively small amount of data. In some not limited embodiments, it could be a bi-directional radio interface adapted for receiving and transmitting the access and/or configuration codes that ensures security and/or configuration of the data receiving and transmission channel. Configuration and/or access identification unit may also be configured as an optical emitter and a photodetector, etc. It also becomes clear that the configuration and/or access identification unit may operate, for example, a presence signal together with the access signals, etc.

Also, in the possible embodiments of capacitive coupling systems and apparatuses between two devices that can have different data communication interfaces, transmitting and/or receiving apparatuses of every device may have a coordination and/or interface unit with external systems, and/or a coordination and/or interface unit with external standard interfaces. Thus, there may occur a data stream conversion of a certain device interface, including standard, parallel or serial one, for example, such as USB, SATA, or HDMI, into a data stream appropriate for capacitive coupling between the devices, wherein transmitting and/or receiving apparatuses can be composed of serializer and/or deserializer units, and/or units of aggregation with other devices and/or encoders/decoders, that are used for example to change the coding physical scheme of the signal being transmitted, etc.

Figure 15:
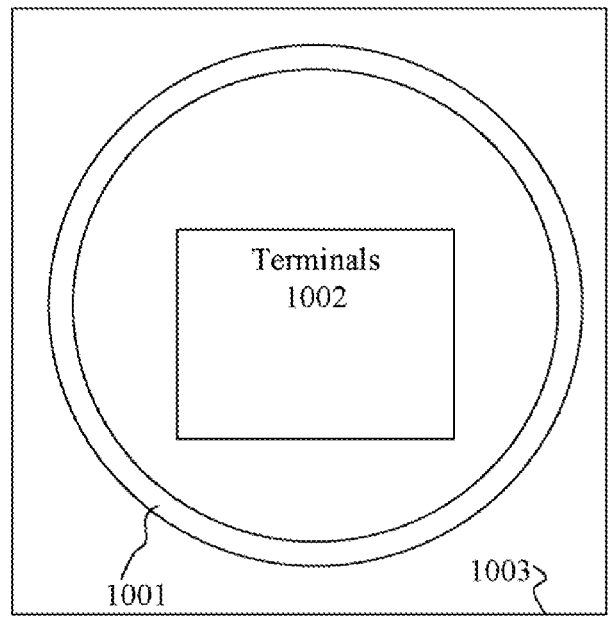
FIG. 15—a view of the area with terminals' working surfaces in the transmitting apparatus and of a rejection groove which surrounds the area.

There is also another possible embodiment of the apparatus 1003, which may be receiving or transmitting, or both receiving or transmitting, and which comprises a rejection groove (FIG. 15), where the rejection groove 1001 made in the conductive materials and filled with non-conductive or dielectric material or air, but not limited hereto, surrounds the terminal area 1002, which may comprise receiving or transmitting or common receiving or transmitting terminals or both receiving and transmitting terminals for the apparatuses, i.e. it can comprise any terminals. There are no requirements imposed in case of symmetry, area 1002 or individual terminals 1002 in relation to the rejection groove as well as the rejection groove can have any contour shape, for example a shape of a circle, as in this example not limited in any way or for example a shape of a square, rectangle etc.

Figure 16:
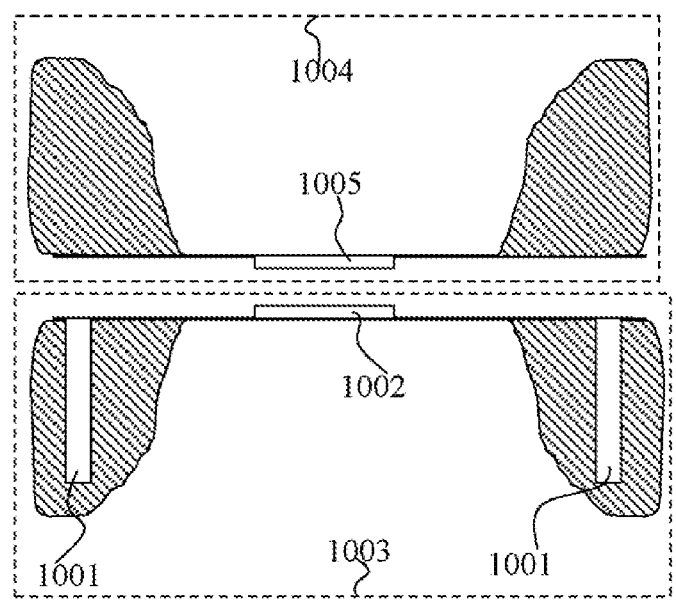
FIG. 16—a cross-section view of the area of terminals of transmitting and receiving apparatuses in an oriented position where one of apparatuses comprises a rejection groove.

During wireless receiving and transmission process in the System, based on any of the embodiments disclosed herein, provided that the area is fixed on the terminals 1002, which belongs to the apparatus 1003 and which comprises a rejection groove, in relation to another corresponding apparatus 1004 with the area which comprises respective terminals 1005, no requirements are imposed, except that there must be conductive material opposite to the rejection groove (FIG. 16). No requirements are imposed in relation to the distance between the fixed devices 1003 and 1004 and to the presence of galvanic coupling between them. In such position of the rejection groove the electromagnetic wave, which exists in the space between the apparatuses 1003 and 1004, when passing by the rejection groove may mutually compensate with the wave, which comes through the rejection groove due to leakage of currents. Full compensation can take place for waves with frequencies that have the phase progression at the double depth of the rejection groove 1001:

(2n−1)*180°, where n is any integer greater than 0.

With different variations of the rejection groove width it is possible to achieve full, or nearly full compensation of electromagnetic waves outside (after) the rejection groove in the direction of propagation of the electromagnetic wave. With the frequency deviation from the one, on which the full compensation due to rejection groove occurs, the amplitude of the wave passing by the groove begins to increase gradually. So it becomes clear that, despite the dependence of the compensation frequency on geometrical parameters of the rejection groove, and the dependence of the compensation effectiveness on the geometry of space and materials between the apparatuses 1003 and 1004, the screening can take place in a certain frequency range, depending on the requirements of the system and the values of the screening factor, including the use of one or several grooves or with different geometries, whereas the screening takes place in the space between apparatuses 1003 and 1004, which is limited by the rejection groove's area.

To expand the operating screening frequency range it is possible to use a number of rejection grooves with calculating the frequency/frequency range for everyone. Thus, the ordinary expert in this field understands that the number of rejection grooves, their shape and depth may vary depending on the system requirements, for example, in one not limited embodiment, several rejection grooves of common depth, but filled with a different dielectric material can be used for the screening in specific range; in the other embodiments, it may be one rejection groove or several different grooves to increase the screening factor at a specific frequency, etc.

In the same time taking into consideration the specific embodiments and application of the invention illustrated and described herein, it is necessary to bear in mind that the invention is not limited to the exact configuration and components disclosed herein. Conditions, descriptions and drawings are used herein only with the purpose of illustration and do not imply any restrictions. Various modifications, changes and variations which will be apparent to the experts can be made in configuration, operation, and details of apparatuses, methods and systems of the present invention disclosed herein without departing from the scope of the invention.

What is claimed is:

1. A wireless capacitive signal receiving and transmission system with compensation of distortions in a channel, the system comprising at least one transmitting apparatus configured to wirelessly transmit signals, the transmitting apparatus comprising:
- a single-channel differential signal precompensator having an input for data signals being transmitted and a plurality of outputs, said single-channel differential signal precompensator being configured to generate at least one pair of prepared signals and at least one pair of direct and inverted precompensation signals on the outputs;
- a single-channel differential signal driver having an input for said at least one pair of prepared signals, an input for said direct and inverted precompensation signals, and a plurality of outputs, said single-channel differential signal driver being configured to generate at least one pair of precompensated direct and inverted signals on the outputs;
- at least one pair of spaced apart transmitting terminals having working surfaces and coupled to said outputs of said single-channel differential signal driver so as to produce respective electric fields which constitute one pair of signals, including said precompensated direct and inverted signal; and at least one receiving apparatus configured to wirelessly receives signals, the receiving apparatus comprising:
- at least one pair of spaced apart receiving terminals having working surfaces and configured to defect electric fields created by said transmitting terminals and reproduce at least one pair of received direct and inverted signals;
- a single-channel differential adaptive signal corrector having a plurality of inputs connected to said at least one pair of receiving terminals and a plurality of outputs for received data signals, said single-channel differential adaptive signal corrector being configured to correct the received signal and to recover data.

2. The wireless capacitive signal receiving and transmission system of claim 1, wherein the transmitting apparatus is oriented with respect to the receiving apparatus so as to provide at least a partial coverage of the working surfaces of said transmitting terminals and said receiving terminals, said working surfaces being separated from each other by at least one non-conductive medium.

3. The wireless capacitive signal receiving and transmission system of claim 2, further comprising a retainer configured to fix transmitting and receiving apparatuses in the oriented position.

4. The wireless capacitive signal receiving and transmission system of claim 2, wherein the transmitting and receiving apparatus are position such that a straight line connecting the midpoints of the working surfaces of terminals of the transmitting apparatus is substantially perpendicular to a straight line connecting the midpoints of the working surfaces of the terminals of the receiving apparatus.

5. A transmitting apparatus for the wireless capacitive signal transmission with compensation of distortions in a channel,
- a single-channel differential signal precompensator having an input for data signals being transmitted and a plurality of outputs, said single-channel differential signal precompensator being configured to generate at least one pair of prepared signal and at least one pair of direct and inverted precompensation signal on the outputs;
- a single-channel differential signal driver having an input for said at least one pair of prepared signal, an input for said direct and inverted precompensation signal, and a plurality of outputs, said single-channel differential signal driver being configured to generate at least one pair of precompensated direct and inverted signal on the outputs;
- at least one pair of spaced apart transmitting terminals having working surfaces and coupled to said outputs of said single-channel differential signal driver so as to produce respective electric fields which constitute one pair of signal, including said precompensated direct and inverted signal.

6. The transmitting apparatus of claim 5, further comprising an encoding unit for data input signals.

7. The transmitting apparatus of claim 5, further configured to generate its presence identifier signal and detect a presence identifier signal of a receiving apparatus.

8. The transmitting apparatus of claim 5, further comprising one or more additional elements selected from the group consisting of: a serializer unit, an aggregation unit for connecting with other transmitting apparatuses, an interface unit, a coordination unit with external systems, a coordination unit with an external standard communication interface, and a retainer configured to fix the transmitting apparatus to a receiving apparatus in an oriented position.

9. The transmitting apparatus of claim 5, further comprising at least one rejection groove formed in a conductive medium and filled with nonconductive material for a least partial surrounding of the working surface of at least one of said spaced apart transmitting terminals.

10. The transmitting apparatus of claim 5, further comprising a delay line.

11. The transmitting apparatus of claim 5, further comprising an amplifier for at least one of the signals selected from the group consisting of direct signal, inverted signal, direct precompensation signal, and inverted precompensation signal, added before input feed point to at least one of the transmitting terminals.

12. A receiving apparatus for the wireless capacitive signal receiving with compensation of distortions in a channel, the receiving apparatus comprising:
- at least one pair of spaced apart receiving terminals configured to detect electric fields created by transmitting terminals and reproduce at least one pair of received direct and inverted signals;
- a single-channel differential adaptive signal corrector having a plurality of inputs connected to said at least one pair of receiving terminals and a plurality of outputs for received data signals, said single-channel differential adaptive signal corrector being configured to correct the received signal and to recover data.

13. The receiving apparatus of claim 12, further configured to generate its presence identified signal and to detect a presence identifier signal of a transmitting apparatus.

14. The receiving apparatus of claim 12, further comprising a decoding unit for recovering of data signals.

15. The receiving apparatus of claim 12, further comprising one or more additional elements selected from the group consisting of: interface and/or coordination unit with external standard data exchange interface, a delay line, a filter, an amplifier of at least one of the direct and inverted received signal, a clock signal restorer from the received data signal, a deserializer unit, an aggregation unit with other receiving apparatuses, and a retainer configured to fix the receiving apparatus to a transmitting apparatus in an oriented position.

16. The receiving apparatus of claim 12, further comprising at least one rejection groove formed in a conductive medium and filled with nonconductive material for at least partial surrounding of a working surface of at least one of said terminals.

17. A method for wireless capacitive signals receiving with compensation of distortion in a channel employing a receiving apparatus configured to receive signals wirelessly and comprising at least one pair of spaced-apart receiving terminals and a single-channel differential adaptive signal corrector configured to correct the received signal, the method comprising the steps of:
  positioning the receiving apparatus against the transmitting apparatus so as to provide at least partial coverage of the working surfaces of both apparatuses' terminals, and that the working surface of the terminals of both apparatuses are separated from each other by at least one non-conductive medium;
  detecting of the electric field reproducing a direct and inverted signal at least on one pair of receiving terminals;
  correcting of one pair of received direct and inverted signals by a single-channel differential adaptive corrector; and
  recovering data.

18. The method of claim 17, further comprising fixing to each other the receiving apparatus and the respective transmitting apparatus on the other side of the wireless capacitive signal transmission.

19. The method of claim 17, further comprising at least one of amplifying, filtering, and delaying of at least one two received direct and inverted signals and/or decoding the recovered data signal.

20. The method of claim 17, further comprising generating of a presence identifier signal of the receiving apparatus and detecting of a presence identifier signal of a transmitting apparatus.

21. A wireless capacitive signal receiving and transmitting system with compensation of distortions in a channel, the system comprising at least a pair of receiving and transmitting apparatuses, wherein at least one of the receiving and transmitting apparatuses comprises a transmitting apparatus configured to wirelessly transmit signals, the transmitting apparatus comprising:
a single-channel differential signal precompensator having an input for data signals being transmitted and a plurality of outputs, said single-channel differential signal precompensator being configured to generate at least one pair of prepared signals and at least one pair of direct and inverted precompensation signals on the outputs;
a single-channel differential signal driver having an input for said at least one pair of prepared signals, an input for said direct and inverted precompensation signals, and a plurality of outputs, said single-channel differential signal driver being configured to generate at least one pair of precompensated direct and inverted signals on the outputs;
a receiving apparatus configured to wirelessly receive signals, the receiving apparatus comprising a single-channel differential adaptive signal corrector having a plurality of inputs connected to said at least one pair of receiving terminals and a plurality of outputs for received data signals, said single-channel differential adaptive signal corrector being configured to correct the received signal and to recover data; and
at least one pair of common terminals or at least two common terminals, depending on the chosen configuration of the transmitting and receiving apparatuses, and a switch configured to switch the common terminals between the receiving and transmitting apparatuses in a transmitting and receiving unit, wherein that each receiving and transmitting apparatus is oriented to the corresponding receiving and transmitting apparatus on the other side so as to ensure at least a partial coverage of respective working surfaces of common receiving and transmitting apparatuses' terminals on one side with the working surfaces of common receiving and transmitting apparatuses' terminals on the other side, and the working surfaces of these apparatuses' common terminals are separated from each other by at least one non-conductive medium.

* * * * *